United States Patent [19]

Reich et al.

[11] Patent Number: 5,066,724

[45] Date of Patent: Nov. 19, 1991

[54] NOVEL FILM COMPOSITIONS

[75] Inventors: Gary J. Reich, Chippewa Falls, Wis.; Richard L. Partlow, Naperville, Ill.

[73] Assignee: Rexene Products Company, Odessa, Tex.

[21] Appl. No.: 506,526

[22] Filed: Apr. 6, 1990

Related U.S. Application Data

[60] Continuation of Ser. No. 277,821, Nov. 30, 1988, abandoned, which is a continuation-in-part of Ser. No. 112,344, Oct. 26, 1987, abandoned, which is a division of Ser. No. 855,972, Apr. 25, 1986, abandoned.

[51] Int. Cl.$^5$ .................... C08L 23/20; C08L 33/08; C08L 23/08; C08J 5/18
[52] U.S. Cl. .................................... 525/227; 524/523
[58] Field of Search .................. 525/227, 194, 240; 428/220

[56] References Cited

U.S. PATENT DOCUMENTS

| | | | |
|---|---|---|---|
| 2,953,541 | 9/1960 | Pecha et al. | 525/227 |
| 4,011,382 | 3/1977 | Levine et al. | 526/96 |
| 4,277,578 | 7/1981 | Yoshimura et al. | 525/211 |
| 4,312,918 | 1/1982 | Bostwick | 428/379 |
| 4,374,882 | 2/1983 | Harlan | 525/227 |
| 4,438,238 | 3/1984 | Fukushima et al. | 524/240 |

FOREIGN PATENT DOCUMENTS

| | | |
|---|---|---|
| 53-021246 | 2/1978 | Japan . |
| 57-195135 | 11/1982 | Japan . |
| 59-006437 | 4/1984 | Japan . |
| 8505216 | 11/1985 | World Int. Prop. O. . |

OTHER PUBLICATIONS

Plastics & Rubber International (P&R)—VLDPE—A New Class of Polyethylenes (4–1986) vol. 11 No. 2 pp. 58–60.

*Primary Examiner*—Carman J. Seccuro
*Attorney, Agent, or Firm*—Harold E. Meier

[57] ABSTRACT

Compositions useful in the manufacture of soft, heat sealable films and sheeting material of improved strength are prepared from blends of about 30 to about 80 wt. % of ethylene - methyl acrylate copolymer (EMA) and about 20 to about 70 wt. % of very low density polyethylene (VLDPE) having a density in the range between about 0.902 and about 0.910 gm/cc.

3 Claims, No Drawings

NOVEL FILM COMPOSITIONS

This application is a continuation of application Ser. No. 277,821, filed Nov. 30, 1988, now abandoned, which is a continuation-in-part of application Ser. No. 112,344 filed Oct. 26, 1987, now abandoned which is a division of Ser. No. 855,972, filed Apr. 25, 1986, now abandoned.

BACKGROUND OF THE INVENTION

Films made from ethylene-methyl acrylate copolymers (EMA) are very soft, limp and flexible with excellent low temperature seal characteristics. They have been used for disposable gloves, medical packaging, hospital sheeting, etc., and also in other applications such as a heat seal layer in co-extrusion.

However, the strength properties of the materials are quite low. Specifically, the low puncture resistance, impact strength and tensile strength render the film unsuitable for many applications.

It is therefore an object of the present invention to provide a resin composition based on EMA, which composition is suitable for the manufacture of shaped articles having improved puncture resistance, tear strength and tensile strength, while retaining the desirable properties of EMA resins. It is also an object of the present invention to provide an EMA based puncture resistant film of improved tear strength and tensile strength.

These and other objects will become apparent from a reading of the specification and appended claims.

THE INVENTION

In accordance with the present invention there is provided a resin composition consisting essentially of:
(A) from about 30 to about 80 percent by weight of an ethylene-methyl acrylate copolymer (EMA) and
(B) from about 20 to about 70 percent by weight of a very low density polyethylene (VLDPE) having a density between about 0.902 and about 0.910 gms/cc.
No other resin components are present in the composition.

The preferred concentration of component (A) is between about 50 and about 70 wt. % and that of component (B) between about 30 and about 50 wt. %.

The EMA copolymer usually contains from about 17 to about 22 wt. % polymerized methyl acrylate groups. It is produced in a conventional high pressure autoclave reactor by the polymerization of a mixture of ethylene and methyl acrylate. The copolymers are available commercially, e.g., the Poly-Eth ® resins from Chevron Chemical Company.

The VLDPE is a linear nonpolar, nonelastomeric polymer of narrow molecular weight distribution. It is a copolymer of ethylene and at least one comonomer selected from $C_4$ to $C_{10}$ alphaolefins. The melt index of the VLDPE copolymer is in the range of from 0.1 to about 10 g/10 min. The copolymer resins are commercially available, e.g., the UCAR ® FLX resins from Union Carbide Corporation. It is critical that VLDPE having a density in the required range be selected as component (B). The use of a VLDPE resin having a density lower than 0.902 gms/cc causes the surfaces of any articles shaped from the composition to be sticky and tacky. Similarly, an elastomeric copolymer of ethylene and at least one $C_4$ and $C_{10}$ alphaolefin comonomer is not at all suitable as component (B) due to the incompatability of the elastomer with the EMA resin, causing major operational problems as well as production of films of unacceptable quality. On the other hand, the use of a linear low density polyethylene (LLDPE) having a density above 0.910 gms/cc instead of the VLDPE would result in an unacceptably stiff product.

The VLDPE concentration should not exceed 70 wt. % to prevent loss of the excellent tactile property associated with EMA. Also, at the higher end of the concentration range the heat sealability would suffer. At lower concentrations where the stiffness and heat sealability no longer would be a problem, the improvements in puncture resistance, tear strength and tensile strength would be quite insufficient to be acceptable.

The composition can, if desired, contain various additives, e.g., antiblocking agents, slip additives, pigments and others as is known in the art.

Thin films made from the resin composition are used with advantage in the manufacture of disposable gloves, which are soft and pliable yet much stronger than conventional disposable gloves made from EMA alone. Other uses include medical packaging, inner coverings for foamed cushions or pads to be inserted into outer decorative covers, etc.

Various methods may be used for producing the film, e.g., by any of the known tubular blowing methods or by the so called chilled roll castinq methods. The thickness of the film can be between about 0.2 and about 2 mil, and should preferably be in the range of from about 0.3 to about 1.5 mil. Disposable glove film is preferably having a thickness between about 0.8 and 1.2 mil.

Blown or cast thicker films or sheet material (e.g., in the range from about 2 to about 10 mil) made from the resin blend are used with great advantage in the manufacture of hypothermic pads or hospital bed cushions. These are pads made by sealing film to film to create channels through which water or other heating or cooling fluids can flow (in the case of hypothermia pads). These pads must have strong seals so they do not rupture, must be extremely soft to conform to varying body shapes, and must not be stiff creating annoying noise and rattle. The use of the EMA/VDPE films satisfy all the requirements of acceptable pads or cushions of these types.

The following examples are provided to further illustrate the invention.

EXAMPLES 1-6

The blends of Examples 1-5 were prepared with the component concentrations shown in Table I. The EMA resin was obtained from Chevron Chemical Company under the trade name Poly-Eth ® 2258. The copolymer contains about 20 wt. % polymerized methyl acrylate units and is an FDA approved material for food packaging. The VLDPE component was Union Carbide Corporation's DFDA ® 1137 Natural 7 resin, which has FDA approval for food contact applications.

Films of about 1 mil thickness were blown from each of the compositions of the examples and subjected to physical testing. The results of such testing are shown in Table I.

The blend of Comparative Example 6 was prepared almost identically to the blend of Example 4, the only difference being that instead of the VLDPE component having a density of 0.906 g/cc was substituted. A blown film of about 1 mil thickness was prepared from the blend and subjected to physical testing. The results are also shown in Table I for ready comparison with those of Examples 1-5. The test results show that the film of Comparative Example 6 containing a LLDPE of a density higher than the maximum allowable density of the VLDPE component used in this invention had an unacceptable stiffness and much lower impact and tensile strength than those of the film of Example 4. Furthermore, the stiffness of the film of Example 6 is worse than that of the film prepared from VLDPE by itself as shown by the comparison of the 1% Secant Modulus values of Examples 5 and 6. Finally, the puncture resistance or impact of the film of Example 6 is worse than that of the film of Example 1 prepared from EMA alone. In other words, the use of LLDPE as a blend component instead of VLDPE does not result in films having the desired softness, flexibility, and puncture resistance needed for the intended applications.

COMPARATIVE EXAMPLES 7-8

In Comparative Example 7 and 8, the VLDPE component of Example 4 was substituted with two different VLDPE resins having densities below the minimum value of 0.902 gms/cc. Thus in Example 7, the VLDPE was Union Carbide resin pellets DFDA ® 1138 having a density of 0.900, which pellets were quite tacky, while the ones in Example 8 (DFDA ® 1210) had a density of 0.890 and actually felt oily to the touch. Since the pellets were so tacky, it was extremely difficult to incorporate them even in the small scale laboratory equipment, and from a commercial production standpoint it would not be feasible to use the required equipment such as blenders and vibratory trays for conveying the resin. In short, VLDPE resin compounds with a density of 0.90 or lower would preclude them from large scale commercial use. Although the films prepared from the blends of Comparative Examples 7 and 8 had acceptable softness, flexibility and puncture resistance, they contained an exessive amount of gels, making them completely unacceptable for commercial use. The test results are shown in Table II.

TABLE II

|  | Example | |
|---|---|---|
|  | 7 | 8 |
| Blend Composition: | | |
| EMA, wt. % | 38[1] | 38[1] |
| VLDPE, wt. % | 60 | 60 |
| VLDPE Density, gm/cc | 0.900 | 0.890 |
| Tensiles: | | |
| Elongation: | | |
| MD, % | 480 | 590 |
| TD, % | 805 | 895 |
| Pull: | | |
| MD, psi | 6065 | 4755 |
| TD, psi | 2830 | 2955 |
| 1% Secant Modulus: | | |
| MD, psi | 7262 | 5491 |
| TD, psi | 8703 | 6566 |
| Tear: | | |
| MD, gms/mil | 27 | 69 |
| TD, gms/mil | 307 | 247 |
| Spencer Impact, gms/mil | 952 (No Breaks) | 964 (No Breaks) |

[1]Remainder is 2% slip and antiblock additives.

Various modifications and alterations can be made to the compositions and films without departing from the scope of this invention, which is defined by the specification and appended claims.

What is claimed is:

1. A resin composition suitable for processing into film consisting essentially of from about 30 to about 80 wt. % of an ethylene-methyl acrylate copolymer and from about 20 to about 70 wt. % of a very low density polyethylene having a density from about 0.902 to about 0.910 gms/cm$^3$, said very low density polyethylene being a non-elastomeric copolymer of ethylene and at least one comonomer selected from alpha-olefins containing from 4 to 10 carbon atoms, said film being soft, pliable, heat sealable and having a thickness from about 0.1 mils to about 10 mils.

2. The composition of claim 1 wherein the ethylene-methyl acrylate comprises from about 17 to about 22 wt. % of polymerize methyl acrylate groups.

3. The composition of claim 1 wherein the concentration of ethylene-methyl acrylate ranges from about 50 % to about 70 wt. % and the concentration of the very low density polyethylene ranges from about 30 to about 50 wt. %.

* * * * *

TABLE I

|  | Example | | | | | |
|---|---|---|---|---|---|---|
|  | 1 | 2 | 3 | 4 | 5 | 6 |
| Blend Comp. | | | | | | |
| EMA, wt. % | 100 | 80 | 60 | 38[1] | 0 | 38[1] |
| VLDPE, wt. % | 0 | 20 | 38[1] | 60 | 95[2] | 0 |
| LLDPE, wt. % | 0 | 0 | 0 | 0 | 0 | 60 |
| Tensiles | | | | | | |
| Elongation: | | | | | | |
| MD, % | 260 | 315 | 355 | 370 | 655 | 640 |
| TD, % | 605 | 600 | 625 | 685 | 785 | 735 |
| Pull: | | | | | | |
| MD, psi | 3250 | 3950 | 4690 | 5215 | 4780 | 4435 |
| TD, psi | 2725 | 2705 | 2715 | 3385 | 3850 | 2930 |
| 1% Secant Modulus | | | | | | |
| MD, psi | 7700 | 8400 | 9400 | 9500 | 15,500 | 16,420 |
| TD, psi | 9100 | 10,600 | 10,900 | 12,400 | 18,000 | 19,750 |
| Tear | | | | | | |
| MD, grams/mil | 34 | 28 | 32 | 32 | 176 | 193 |
| TD, grams/mil | 105 | 177 | 316 | 401 | 336 | 629 |
| Spencer Impact, gms/mil | 867 | 872 | 839 | 1111 | — | 800 |

[1]Remainder is 2% slip and antiblock additives.
[2]Remainder is 5% slip and antiblock additives.